(12) United States Patent
Chang et al.

(10) Patent No.: US 6,700,706 B2
(45) Date of Patent: Mar. 2, 2004

(54) FABRY-PEROT OPTICAL FILTER DEVICE

(75) Inventors: Sean Chang, Tao Yuan (TW);
Shih-chien Chang, Tai Shan Hsiang (TW)

(73) Assignee: Delta Electronics, Inc., Tao Yuan (TW)

( * ) Notice: Subject to any disclaimer, the term of this patent is extended or adjusted under 35 U.S.C. 154(b) by 0 days.

(21) Appl. No.: 10/214,079

(22) Filed: Aug. 6, 2002

(65) Prior Publication Data

US 2003/0227687 A1 Dec. 11, 2003

(30) Foreign Application Priority Data

Jun. 7, 2002 (TW) ........................... 91112478 A

(51) Int. Cl.⁷ .................................. G02B 27/00
(52) U.S. Cl. ............... 359/577; 359/260; 359/584; 356/506; 356/519; 356/454
(58) Field of Search ................ 359/260, 577, 359/589, 584; 356/519, 454, 480, 506; 372/20

(56) References Cited

U.S. PATENT DOCUMENTS

| 6,075,647 | A | * | 6/2000 | Braun | 359/578 |
| 2002/0145803 | A1 | * | 10/2002 | He | 359/498 |
| 2002/0191294 | A1 | * | 12/2002 | Duggan | 359/578 |
| 2003/0053078 | A1 | * | 3/2003 | Missey | 356/519 |

* cited by examiner

*Primary Examiner*—Drew Dunn
*Assistant Examiner*—Leo Boutsikaris
(74) *Attorney, Agent, or Firm*—Pro-Techtor International Services

(57) ABSTRACT

The present invention discloses a Fabry-Perot optical filter device, which includes a Fabry-Perot element for allowing a light to pass through and optically filtering the light at least twice, and at least one reflecting element for reflecting the light passed through the Fabry-Perot element back to the same Fabry-Perot element during the at least two optical filtering. The Fabry-Perot optical filter device further includes an input terminal used to import the light into the Fabry-Perot optical filter device, and an output terminal used to export the light after the at least two optical filtering.

10 Claims, 3 Drawing Sheets

FABRY-PEROT OPTICAL FILTER DEVICE

BACKGROUND OF THE INVENTION

1. Field of the Invention

The invention relates to an optical filter device, and more particularly, to a Fabry-Perot optical filter device, which is composed of a Fabry-Perot element operating on the same principle as Fabry-Perot interferometers and a plurality of reflecting elements.

2. Description of the Related Art

The development in optical communication has been focused in the field of technology during the recent years. In addition, the discovery of optical fiber, the maturation of semiconductor process techniques, and the growth of micro-electronic-mechanical process techniques have spurred the optical communication system development with constant advancement.

The optical communication is based on the traveling of light waves, which is used to transmit information, the so-called optical signals. During the information communication, the information transmission and reception quality is greatly influenced by the characteristics of light waves. Generally, optical communication systems include active and passive optical elements. In the optical fiber route, for instance, active elements included may be light transceiver modules, optoelectronic converters. Passive elements included may be fiber couplers, fiber attenuators, fiber filters, fiber isolators, fiber polarizers, wavelength dividers, fiber connectors, optical switches, fiber collimators, fiber circulators, fiber wavelength multiplexers, fiber gratings, fiber amplifiers, and fiber jumpers and leads.

A light wave is of multi-color light wave. Therefore, physical mechanisms such as various light gratings, prisms, or interferometers, Mach-Zehnder interferometers and Fabry-Perot interferometers for example, are required for optical filtering and beam-splitting whenever a information transmission is completed by employing light characteristics of various color lights, what is the main purpose of optical filters. FIG. 1 is the schematic diagram of a typical optical filter device 1 according to the prior art. Referring to the diagram, the optical filter device 1 includes mainly an optical filter element module 2. When an optical signal with wavelengths $\lambda_1 \sim \lambda_n$ is inputted and passed through the optical filter element module 2, an output optical signal of a particular wavelength $\lambda_i$ is obtained.

Considering the circumstance where a Fabry-Perot device operating on the same principle as Fabry-Perot interferometers is used as the optical filter element module 2 of the optical filter device 1 in FIG. 1, the wavelength distribution of light waves passed through the Fabry-Perot device tend to have a Gaussian distribution. However, the band pass effect of Gaussian distribution is not satisfactory. Take the commonly used standard specification of 100 GHz wavelength channel in fiber communication for example, the stop band is generally defined at −25 dB and the start band at −3 dB. In this case, when the light waves pass the Fabry-Perot device once, the stop band of the light waves passed through the Fabry-Perot device will be quite large. Thus, optical signals from neighboring channels would enter, which results in quite large cross talks between each of the channels. Referring to FIG. 2 and FIG. 3. FIG. 2 is a schematic diagram of an optical filter module consisted of n-unit of Fabry-Perot devices connected in series according to the prior art. FIG. 3 is a Guassian distribution diagram of light waves with a particular wavelength 1550 nm passed through an optical filter device consisted of two Fabry-Perot elements connected in series according to the prior art. As shown in FIG. 2, a prior optical filter method using an optical filter device module 2 formed by a plurality of Fabry-Perot elements 201 connected in series is utilized to decrease the stop band of each optical channel so as to reduce the cross talks between each of the channels. As shown in FIG. 3, the horizontal axis represents the light wave wavelength while the vertical axis represents the light wave energy, and the minus sign represents the energy attenuation of the light waves passed. The stop band of the light waves passed through the first Fabry-Perot device (or single cavity) is 7.1 nm, and the stop band of the light waves passed through the second Fabry-Perot device (or dual cavity) is 1.2 nm. Thus, it is observed that the stop bands is in fact decreased apparently by passing an optical signal through a plurality of Fabry-Perot devices, and thereby the cross talk between each of the optical channels is reduced.

Nevertheless, the Fabry-Perot elements with respect to the aforesaid prior optical filter device utilize the principle with respect to optical interference on the optical space between the two reflect surfaces to, control the central wavelength of the filters. Thus, if the space between various Fabry-Perot devices 201 connected in series as shown in FIG. 2 could not be adjusted to be equivalent according to the same central wavelength (that is, the expected particular wavelength $\lambda_i$), the optical signal transmission would be surely affected by the improper space adjustment of the Fabry-Perot elements 201 connected in series. However, It is indeed difficult to simultaneously adjust the space to be same for the fact that the smallest light wavelength unit is nm.

SUMMARY OF THE INVENTION

In view of the above, an object of the invention is to provide a Fabry-Perot optical filter device, so that a light wave with particular wavelength $\lambda_i$ is able to pass through a same Fabry-Perot optical filter element more than once, solving the issue of simultaneous space adjustment difficulty occurred in the aforesaid prior Fabry-Perot optical filter devices.

The other object of the invention is to provide a Fabry-Perot optical filter device, so that a light wave with a particular wavelength $\lambda_i$ is able to pass through a same Fabry-Perot optical filter device more than once, gradually and effectively decreasing the stop bands of the channels, thereby reducing the cross talks between each of the channels.

The Fabry-Perot optical filter device in accordance with the invention includes a Fabry-Perot element that allows a light to pass through and optically filters the light at least twice; and a plurality of reflecting elements that reflect the light passed through the Fabry-Perot device back to the same Fabry-Perot device during the at least twice filtering. The Fabry-Perot optical device further includes an input terminal used to import the light into the Fabry-Perot optical filter device, and an output terminal used to export the light after the at least twice filtering.

In the present invention, the Fabry-Perot device can be a Fabry-Perot Etalon, a wavelength tunable Fabry-Perot resonator manufactured by micro-electro-mechanical-system (MEMS) technique or other elements operating on the same principle as Fabry-Perot interferometers. The plurality of reflecting elements can be various kinds of reflecting mirrors or reflecting prisms provided at the two relative sides of the Fabry-Perot device, so that the Fabry-Perot element can optically filter the light at least twice. The input terminal and the output terminal can be provided as different terminals or the same terminal.

The Fabry-Perot device of a preferred embodiment in accordance with the invention includes a Fabry-Perot element used to selectively and optically filter an optical signal with a particular wavelength $\lambda_i$ from an optical signal with wavelengths $\lambda_1 \sim \lambda_n$ at least twice; and a plurality of reflecting prisms that reflect the optical signal with wavelength $\lambda_i$ back to the Fabry-Perot device. In addition, the Fabry-Perot device of the embodiment further includes an input terminal used to import the optical signal with wavelengths $\lambda_1 \sim \lambda_n$ and at least one output terminal used to export the optical signal with wavelength $\lambda_i$ after the at least two optical filtering.

In the embodiment, the Fabry-Perot element can be a Fabry-Perot Etalon, a wavelength tunable Fabry-Perot resonator manufactured by micro-electro-mechanical-system (MEMS) technique or other elements operating on the same principle as Fabry-Perot interferometers. The reflecting prisms are positioned at two opposite sides of the Fabry-Perot element and can be replaced by all sorts of reflectors, so that the Fabry-Perot element can optically filter the optical signal at least twice. The input terminal and the output terminal are different terminals; the input terminal is aligned with one end of a first collimator and the output terminal is aligned with one end of a second collimator.

The Fabry-Perot optical filter device of another embodiment in accordance with the invention includes a Fabry-Perot element used to optically filter an optical signals with wavelength $\lambda_i$ from an optical signal with wavelengths $\lambda_1 \sim \lambda_n$ at least twice; and a reflecting prism used to reflect the optical signal with the particular wavelength $\lambda_i$ back to the Fabry-Perot element. In addition, the Fabry-Perot device of the invention further includes a common input terminal and output terminal used to import the optical signal with wavelengths $\lambda_1 \sim \lambda_n$ and export the optical signal with the particular wavelength $\lambda_i$ after the at least two optical filtering, respectively.

In the embodiment, the Fabry-Perot element can be a Fabry-Perot Etalon, a wavelength tunable Fabry-Perot resonator, or other elements operating on the same principle as Fabry-Perot interferometers. The reflecting prisms are positioned at the two opposite sides of the Fabry-Perot element and can be replaced by various kinds of reflecting mirrors, so that the Fabry-Perot element is able to optically filter the optical signal with wavelength $\lambda_i$ at least twice. The common input terminal and output terminal are provided on the same side and share a same collimator.

DESCRIPTION OF THE PREFERRED EMBODIMENTS

Figure 1:
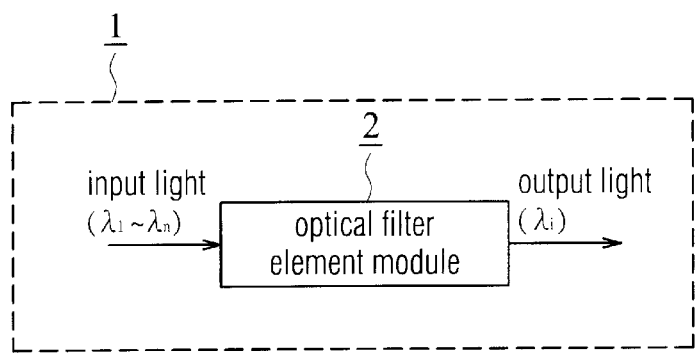
FIG. 1 is a schematic diagram of a typical optical filter device according to the prior art.
Figure 2:
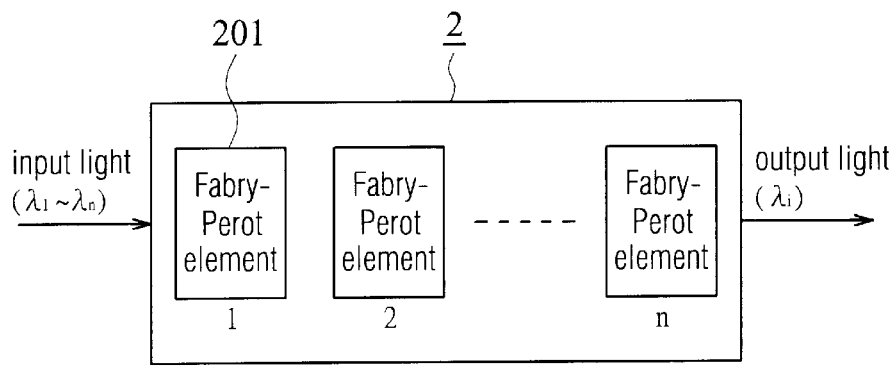
FIG. 2 is a schematic diagram showing an optical filter module consisted of n-unit of Fabry-Perot devices connected in series according to the prior art.
Figure 3:
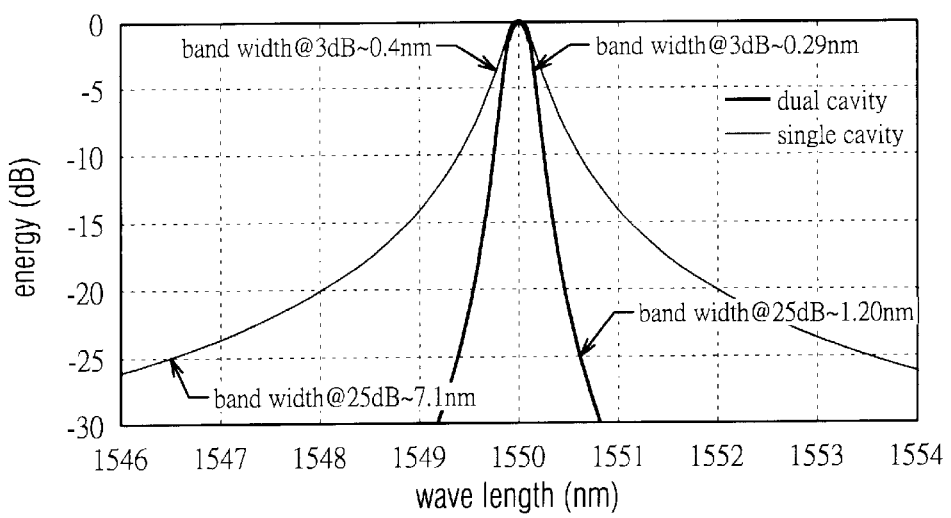
FIG. 3 is a Guassian distribution diagram of light waves with a particular wavelength 1550 nm passed through an optical filter device consisted of two Fabry-Perot elements connected in series according to the prior art.
Figure 4:
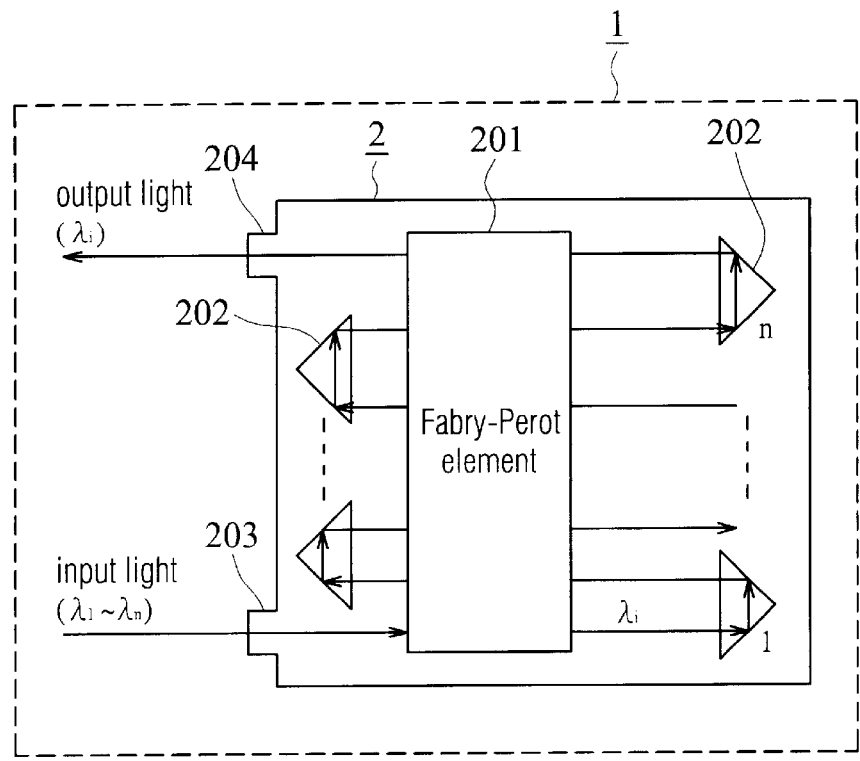
FIG. 4 is a schematic diagram showing an example of the Fabry-Perot optical filter device according to the first preferred embodiment of the present invention.

FIG. 4 is the schematic diagram of the Fabry-Perot optical filter device 1 according to the first embodiment of the present invention. Referring to FIG. 4, the optical filter element module 2 of the Fabry-Perot optical filter device 1 includes at least one Fabry-Perot element 201 and n-unit of reflecting elements 202, where n is greater than 1. The Fabry-Perot optical filter device 1 further includes an input terminal 203 and an output terminal 204, which are used to import an input optical signal with wavelengths $\lambda_1 \sim \lambda_n$ and to export an output optical signal with a particular wavelength $\lambda_i$, respectively.

According to the optical filter operating principle of Fabry-Perot devices, when an input light with wavelengths $\lambda_1 \sim \lambda_n$ is imported to a Fabry-Perot device, the space between the two reflect surfaces of the Fabry-Perot device can be adjusted to obtain an output light with a particular wavelength $\lambda_i$. As a result, for the Fabry-Perot optical filter device 1 of the first preferred embodiment, when an input light with wavelengths $\lambda_1 \sim \lambda_n$ is imported to the Fabry-Perot element 201 through the input terminal 203, the Fabry-Perot element 201 filters a particular light with wavelength $\lambda_i$ according to the space between the two reflect surfaces of the Fabry-Perot device. Then the n-unit of reflecting elements 202 positioned at two opposite sides of the Fabry-Perot device successively reflect the light with the particular wavelength $\lambda_i$ back to the same Fabry-Perot element 201, with the last light wave passing through the Fabry-Perot element 201 exported from the output terminal 204. Because of the number of n-unit of reflecting element 202 is larger than 1, and therefore the filtered light with wavelength $\lambda_i$ passes the same Fabry-Perot element 201 for more than once (at least twice). Consequently, the issue of simultaneous space adjustment between the prior Fabry-Perot optical filter devices is solved, and at the same time, the objects of decreasing the stop band and reducing the cross talks as expected are also accomplished.

It is to be noted that, the Fabry-Perot element 201 described herein can be a Fabry-Perot Etalon accounted of the conventional optical elements, a wavelength tunable Fabry-Perot resonator manufactured by micro-electro-mechanical-system (MEMS) technique, or other elements operating on the same principle as Fabry-Perot interferometers. The reflecting elements mentioned above can be various kinds of reflecting prisms or reflecting mirrors, and the number n of the reflecting elements provided can be decided as required so that the light wave with a particular wavelength $\lambda_i$ passes the same Fabry-Perot element 201 more than once (at least twice) as the expected number of times.

Figure 5:
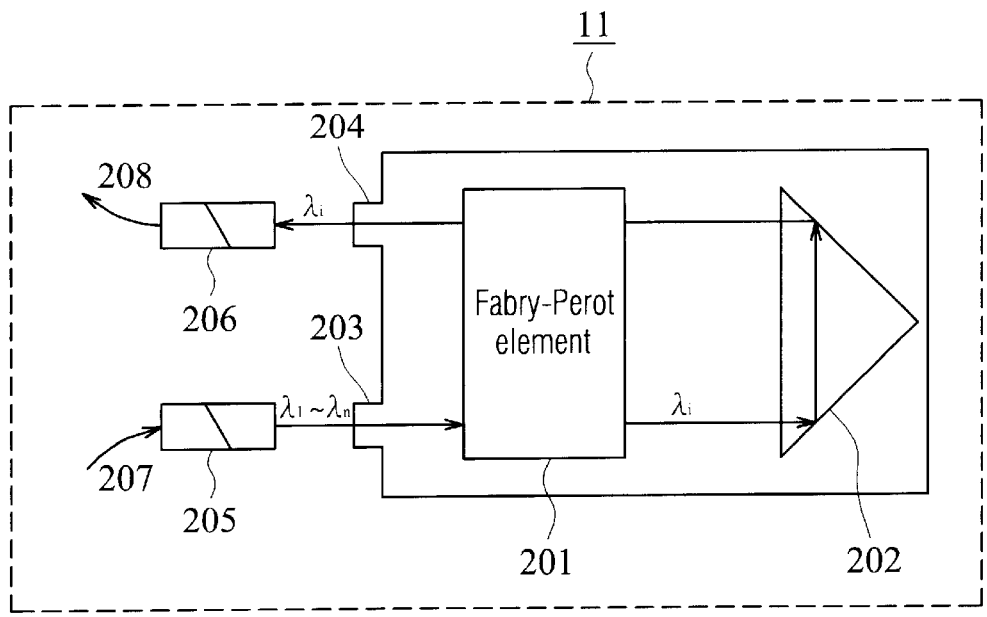
FIG. 5 is a schematic diagram of the Fabry-Perot optical filter device according to the second preferred embodiment of the present invention.

FIG. 5 is the schematic diagram of a Fabry-Perot optical filter device 11 according to the second preferred embodiment of the present invention. Referring to FIG. 5, the Fabry-Perot optical filter device 11 includes a Fabry-Perot element 201, a reflecting prism 202, an input terminal 203, and an output terminal 204. The input terminal 203 and the output terminal 204 are provided as different terminals; the input terminal 203 is aligned with one end of a collimator 205, and the output terminal 204 is aligned with the one end of another collimator 206. In addition, the other terminals of the collimator 205 and the collimator 206 are connected with a transmitter 207 and a receiver 208, respectively.

Considering the Fabry-Perot optical filter device 11 of the second embodiment of the present invention, an input light with wavelength $\lambda_1 \sim \lambda_n$ is imported into the collimator 205 from the transmitter 207 and introduced to the Fabry-Perot element 201 through the input terminal 203. After passing through the Fabry-Perot element 201, a light wave with a particular wavelength $\lambda_i$ is obtained and then reflected back to the Fabry-Perot element 201 by the reflecting prism 202. After passing through the Fabry-Perot element 201 again, the light wave is exported from the output terminal 204 and sent to the receiver 208 through the collimator 206. As a result, the light wave with the particular wavelength $\lambda_i$ passes through the same Fabry-Perot element 201 twice, thereby decreasing the stop band and reducing the cross talks between each of the optical channels.

It is to be noted that, the Fabry-Perot element 201 in the above description can be a Fabry-Perot Etalon of the conventional optical elements, a wavelength tunable Fabry-Perot resonator, or other elements operating on the same principle as Fabry-Perot interferometers. Also, the reflecting prisms described above can be replaced by various kinds of reflectors; the number of provided reflecting prisms can be n, where n is greater than 1 as required so that the light wave with wavelength $\lambda_i$ passes through the same Fabry-Perot element 201 more than once (at least twice) as the expected number of times.

Figure 6:
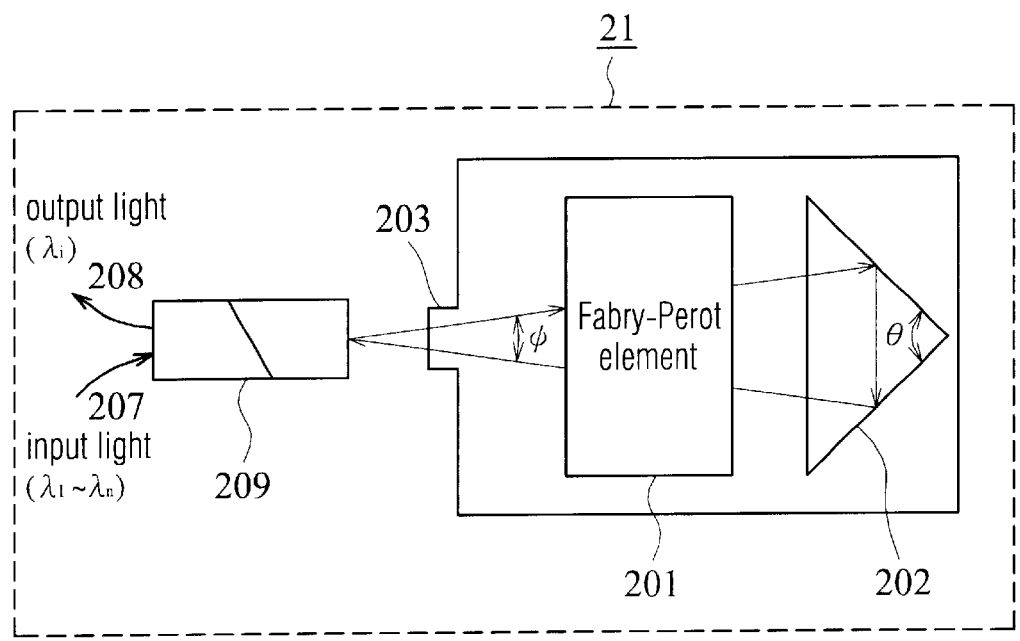
FIG. 6 is a schematic diagram of the Fabry-Perot optical filter device according to the third preferred embodiment of the present invention.

FIG. 6 is the schematic diagram of a Fabry-Perot optical filter device 21 according to the third preferred embodiment of the present invention. Referring to FIG. 6, the Fabry-Perot optical filter device 21 includes a Fabry-Perot element 201, a reflecting prism 202, and an input terminal 203. The input terminal 203 also functions as the output terminal, that is, the input terminal and the output terminal are the same terminal. The input terminal 203 is aligned with one end of a collimator 209, and the other end of the collimator 209 is connected with a transmitter 207 and a receiver 208.

Considering the Fabry-Perot device 21 of the third embodiment of the present invention, an input light with wavelengths $\lambda_1 \sim \lambda_n$ is produced by the transmitter 207 and sent to the collimator 209, and imported to the Fabry-Perot element 201 through the input terminal 203. After passing through the Fabry-Perot element 201, the light wave with a particular wavelength $\lambda_i$ is reflected back to the Fabry-Perot element 201 by the reflecting prism 202. After passing through the Fabry-Perot element 201 again, the light wave is exported by the output terminal 203 and sent back to the receiver 208 through the collimator 209. As a result, the light wave with the particular wavelength $\lambda_i$ passes through the Fabry-Perot element 201 twice, thereby decreasing the stop band and the cross talks between each of the optical channels.

In this embodiment, the light is transmitted from the transmitter 207 and sent back to the receiver 208. The angle difference $\phi$ between the imported and exported light and the angle $\theta$ of the reflecting prism 202 are determined by the refractive index of the reflecting prism 202 and the particular wavelength $\lambda_i$, where angles $\phi$ and $\theta$ should obey the Snell principle and refraction principle in optics.

It is to be noted that, the Fabry-Perot element 201 described above can be a Fabry-Perot Etalon of the conventional optical elements, a wavelength tunable Fabry-Perot resonator manufactured by micro-electro-mechanical-system (MEMS) techniques, or other elements operating on the same principle as Fabry-Perot interferometers. The reflecting prism described above can also be replaced by various kinds of reflectors; the number of reflecting prisms provided can be n, where n is greater than 1 as required so that the light wave with wavelength $\lambda_i$ passes through the same Fabry-Perot element 201 more than once (at least twice) as the expected number of times.

The examples in the above descriptions are only illustrative but not limitative. For those who skilled in the related technique, various variations and modifications of the described embodiments can be made without departing from the true spirit and scope of the invention. To set the standard, the invention is defined as in the appended claims.

What is claimed is:

1. A Fabry-Perot optical filter device comprising:
   a Fabry-Perot element for selectively and optically filtering an optical signal with a particular wavelength $\lambda_i$ from an optical signal with different wavelengths $\lambda_1 \sim \lambda_n$ for a plurality of times; and
   at least one reflecting element for reflecting the optical signal with the particular wavelength $\lambda_i$ back to the Fabry-Perot device during the plurality of times of optical filtering.

2. The Fabry-Perot optical filter device as claimed in claim 1, further comprising:
   an input terminal for importing the optical signal with the wavelengths $\lambda_1 \sim \lambda_n$; and
   an output terminal for exporting the optical signal with the particular wavelength $\lambda_i$ after the plurality of times of optical filtering.

3. The Fabry-Perot optical filter device as claimed in claim 1, wherein the number of the plurality of times of the optical filtering is the number of the plurality of reflecting elements plus 1.

4. The Fabry-Perot optical filter device as claimed in claim 1, wherein the Fabry-Perot element is a Fabry-Perot Etalon.

5. The Fabry-Perot optical filter device as claimed in claim 1, wherein the Fabry-Perot element is manufactured by micro-electro-mechanical-system (MEMS) techniques.

6. The Fabry-Perot optical filter device as claimed in claim 1, wherein the at least one reflecting element includes a reflecting prism.

7. The Fabry-Perot optical filter device as claimed in claim 1, wherein the at least one reflecting element includes a reflecting mirror.

8. The Fabry-Perot optical filter device as claimed in claim 1, wherein reflecting elements are positioned at two opposite sides of the Fabry-Perot element.

9. The Fabry-Perot optical filter device as claimed in claim 2, wherein the input terminal and output terminal are different terminals.

10. The Fabry-Perot optical filter device as claimed in claim 2, wherein the input terminal and output terminal are the same terminal.

* * * * *